United States Patent [19]

Moore

[11] 3,846,502
[45] Nov. 5, 1974

[54] 2-METHOXY-3-H-PERFLUOROBUTANE

[75] Inventor: George L. Moore, South Plainfield, N.J.

[73] Assignee: Airco, Inc., New York, N.Y.

[22] Filed: July 25, 1972

[21] Appl. No.: 275,020

Related U.S. Application Data

[62] Division of Ser. No. 168,380, Aug. 2, 1971, Pat. No. 3,723,629.

[52] U.S. Cl. .................................... 260/614 F
[51] Int. Cl. .................................... C07c 43/00
[58] Field of Search ....................... 260/614 F

[56] References Cited
UNITED STATES PATENTS

| | | | |
|---|---|---|---|
| 3,346,448 | 10/1967 | Gilbert et al. | 260/614 F X |
| 3,445,524 | 5/1969 | Gilbert et al. | 260/614 F |
| 3,557,294 | 1/1971 | Dear et al. | 260/614 F X |
| 3,663,715 | 5/1972 | Terrell | 260/614 F X |

FOREIGN PATENTS OR APPLICATIONS

| | | | |
|---|---|---|---|
| 1,283,820 | 11/1968 | Germany | 260/614 F |
| 1,294,949 | 5/1969 | Germany | 260/614 F |

OTHER PUBLICATIONS

Fischer, "Toxicology and Applied Pharmacology" 14, 114–118 (1969).

*Primary Examiner*—Howard T. Mars
*Attorney, Agent, or Firm*—Roger M. Rathbun; Edmund W. Bopp; H. Hume Mathews

[57] ABSTRACT

2-Methoxy-3-hydroperfluorobutane of the formula

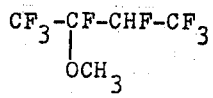

is useful as an inhalation analgesic and anesthetic.

1 Claim, No Drawings

2-METHOXY-3-H-PERFLUOROBUTANE

This is a division of application Ser. No. 168,380 filed Aug. 2, 1971, now U.S. Pat. No. 3,723,629.

This invention relates to the aliphatic ether compound 2-methoxy-3-hydroperfluorobutane and its use in producing analgesia and anesthesia and anesthetic-susceptible mammals. This compound has the formula

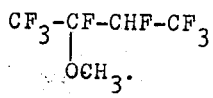

2-Methoxy-3-hydroperfluorobutane is a mild analgesic and anesthetic, the use of which is particularly desirable where very close control over the plane of anesthesia in the patient is desired or the amount of anesthetic administered is not to be regulated with great exactness. The compound lends itself to effective use as an inhalant anesthetic in respirable mixtures containing life-supporting concentrations of oxygen, with or without other inhalation anesthetics, such as nitrous oxide. Administration of the compound may be by any of the well known techniques for administering general inhalation anesthetics, for example by using the open drop, semi-closed, or closed systems.

The effective amount of the compound of this invention to be employed depends on the level of anesthesia to which the mammal is to be brought, the rate at which anesthesia is to be induced, and the length of time over which the anesthesia is to be maintained. Minor volume percentages of the compound in oxygen can often be employed. The amount used should be sufficient to provide a significant anesthetic effect but not so much as to produce unacceptable deleterious side effects. For instance, about 5 to 15 volume percent of the compound may often be used. The amount of anesthesia to be used can be regulated, starting with a small amount of the ether and gradually increasing the amount until the desired plane of anesthesia is reached. By then monitoring the physical reactions of the mammal, as is the usual procedure, the duration and plane of anesthesia can be readily controlled.

The present compound is also easily miscible with other organic liquids, including fats and oils, and has useful solvent properties, for example as a solvent for fluorinated olefins and other fluorinated materials, such as fluoro waxes. The compound of this invention may be used to prepare pastes and dispersions of such materials useful for coatings and the like, and may be used as a degreasing agent. In the latter capacity, for example, the ether compound of this invention can be used as a solvent to remove grease from a metal surface that is to be painted.

The ether compound of the present invention can be prepared by addition reacting equimolar amounts of methanol and perfluorobutene-2. As a specific example of that preparation, 58 g. of perfluorobutene-2 was added to a solution of NaOCH$_3$ (34 g.) in absolute methanol (220 ml.) at 5°–12°C. over a period of 1-¼ hr., followed by warming to 60°C. for 6 hrs. The mixture was poured into water, neutralized, and a crude product was isolated by refluxing the aqueous mixture into a Dean-Stark tube. After drying over anhydrous K$_2$CO$_3$ the organic layer yielded an azeotropic mixture distilling at 49.5°–52.5°. Substantially pure 2-methoxy-3-hydroperfluorobutane was obtained from this mixture by preparative chromatography.

Calculated for C$_5$H$_4$F$_8$O : F, 65.9%
Found : F, 65.2%.

This normally liquid compound has a boiling point of 64.5°C., a specific gravity of 1.50, a vapor pressure at 25°C. of 180 mm. Hg., and a mild odor. It is nonflammable.

In order to determine the potency of the ether of the present invention as an inhalation anesthetic in combination with oxygen, tests were carried out on mice. The compound tested was at least 99.5 percent pure as determined by vapor phase chromatography. In the tests, the ether compound is administered to test mice by a standard procedure in which a measured quantity of the agent is placed in a laboratory jar and allowed to completely vaporize so as to give a calculated vapor concentration. The test mice are then quickly placed in the jar and observed. Anesthesia is determined by observing the righting reflex of the mice. Recovery time is measured beginning when the mice are transferred from the test jar to room air and ending when the mice are observed to be able to walk.

In such tests the 2-methoxy-3-hydroperfluorobutane induced anesthesia in 3 minutes 23 seconds when used at a vapor concentration of 8 percent. Recovery therefrom was immediate. The mice were restless and rotating while maintained under the anesthesia. Some analgesia was observed.

At a 12 percent vapor concentration level the induction period was shortened to 1 minute 26 seconds and was accompanied by marked excitement. Maintenance was generally quiet, with 20 percent of the test subjects having jerking movements. Recovery required 1 minute 20 seconds.

While there has been described what are at present considered to be the preferred embodiments of the invention, it will be understood that various modifications may be made therein which are within the true spirit and scope of the invention.

I claim:

1. 2-Methoxy-3-hydroperfluorobutane of the formula

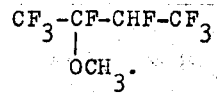

* * * * *